(12) United States Patent
Godsell

(10) Patent No.: US 8,602,257 B2
(45) Date of Patent: Dec. 10, 2013

(54) MULTIFUNCTIONAL HAND SANITIZER DEVICE

(76) Inventor: David Godsell, Atlanta, GA (US)

( * ) Notice: Subject to any disclaimer, the term of this patent is extended or adjusted under 35 U.S.C. 154(b) by 445 days.

(21) Appl. No.: 12/560,565

(22) Filed: Sep. 16, 2009

(65) Prior Publication Data

US 2011/0062178 A1    Mar. 17, 2011

(51) Int. Cl.
*B65H 1/00* (2006.01)
*A47F 7/06* (2006.01)
*B67D 7/06* (2010.01)
*B65D 69/00* (2006.01)

(52) U.S. Cl.
USPC ............. 221/34; 221/96; 221/192; 221/63; 221/185; 221/1; 221/45; 221/302; 221/135; 221/445; 222/192; 222/18; 222/183; 222/383.1; 222/321.9; 206/229; 206/225; 206/581

(58) Field of Classification Search
CPC ............. B65H 1/00; A47F 1/00; B67D 1/07; B67D 7/06; B65D 69/00; B65D 71/00
USPC ............. 221/96, 34, 192, 63, 185, 1, 45, 302, 221/135, 445; 222/192, 181, 18, 183, 222/383.1, 321.9; 401/125; 206/229, 225, 206/581
See application file for complete search history.

(56) References Cited

U.S. PATENT DOCUMENTS

| | | | |
|---|---|---|---|
| 603,316 A * | 5/1898 | Bush | 206/226 |
| 1,582,645 A * | 4/1926 | Findley | 206/226 |
| 1,903,312 A * | 4/1933 | Ellis | 206/570 |
| 1,942,953 A * | 1/1934 | Bennett | 206/229 |
| 2,707,292 A * | 5/1955 | Lustbader | 401/139 |
| 2,789,725 A * | 4/1957 | Carper | 401/125 |
| 2,985,289 A * | 5/1961 | U'Ren | 206/229 |
| 4,516,676 A * | 5/1985 | Cournoyer | 206/226 |
| 4,927,284 A * | 5/1990 | Tsai | 401/195 |
| 5,439,104 A * | 8/1995 | Wolska-Klis | 206/233 |
| 6,010,034 A * | 1/2000 | Walthers | 222/135 |
| 6,279,775 B1 * | 8/2001 | Parkes et al. | 221/63 |
| 6,321,937 B1 * | 11/2001 | DeSimone et al. | 221/45 |
| 6,394,987 B1 * | 5/2002 | Sandlin et al. | 604/289 |
| 6,431,405 B2 * | 8/2002 | Irwin | 222/192 |
| 6,528,766 B1 * | 3/2003 | Parks et al. | 219/386 |
| 6,601,737 B1 * | 8/2003 | Sandler | 222/192 |
| 6,644,563 B2 * | 11/2003 | Presson | 239/289 |
| 6,726,016 B2 * | 4/2004 | Chen | 206/581 |

(Continued)

FOREIGN PATENT DOCUMENTS

WO    WO9929602    6/1999

*Primary Examiner* — Gene O. Crawford
*Assistant Examiner* — Rakesh Kumar
(74) *Attorney, Agent, or Firm* — Smith Risley Tempel Santos LLC; Matthew T. Hoots

(57) ABSTRACT

A combination dispenser for hand wipes and hand gel, configured to be held in a cup holder, is disclosed. Some embodiments of the device are substantially cylindrical in order to fit within a cup holder and substantially prevent shifting. Further, embodiments are partitioned internally to provide at least two separate compartments. The partitioned compartments are uniquely designed to hold and provide access to various products such as, but not limited to, hand wipes, sanitizing gel, lotion, fragrance, liquid soap or the like. In some embodiments, a lid covers the device to prevent the hand wipes from drying out. Also, some embodiments include a pump aspect that is in fluid communication with fluid products contained within a portion of the device.

16 Claims, 4 Drawing Sheets

(56) References Cited

U.S. PATENT DOCUMENTS

| | | | |
|---|---|---|---|
| 6,883,989 B2* | 4/2005 | Kushner et al. | 401/125 |
| 7,219,815 B2 | 5/2007 | Shannon et al. | |
| 7,370,754 B2* | 5/2008 | Kushner | 206/38 |
| 7,497,351 B2* | 3/2009 | Amundson et al. | 221/96 |
| 7,585,125 B2* | 9/2009 | Muhlhausen et al. | 401/125 |
| 7,587,125 B2* | 9/2009 | Komoda | 386/252 |
| 7,841,795 B2* | 11/2010 | Huang | 401/137 |
| 7,850,041 B2* | 12/2010 | Amundson et al. | 221/96 |
| 7,954,671 B2* | 6/2011 | Terrasi | 222/129 |
| 8,302,810 B2* | 11/2012 | Mulhem et al. | 221/34 |
| 8,371,479 B2* | 2/2013 | Luft | 222/192 |
| 2006/0011660 A1* | 1/2006 | Sandlin | 222/321.9 |
| 2006/0060490 A1 | 3/2006 | Rodriguez | |
| 2006/0076357 A1* | 4/2006 | Braat et al. | 221/34 |
| 2006/0131319 A1 | 6/2006 | McDonald | |
| 2006/0151513 A1* | 7/2006 | Shadrach, III | 221/1 |
| 2007/0289987 A1 | 12/2007 | Tramontina et al. | |
| 2008/0011782 A1 | 1/2008 | Sidman | |
| 2008/0289993 A1 | 11/2008 | Flannery | |
| 2009/0057331 A1* | 3/2009 | Fryan et al. | 221/96 |
| 2009/0065521 A1* | 3/2009 | Amundson et al. | 221/1 |
| 2009/0090737 A1* | 4/2009 | Franco | 221/96 |
| 2010/0301136 A1* | 12/2010 | Scott | 239/289 |

* cited by examiner

MULTIFUNCTIONAL HAND SANITIZER DEVICE

TECHNICAL FIELD

The present invention relates generally to a device for storing and dispensing hand sanitizing gel and moist hand wipes, and, more specifically, to a device for storing hand sanitizing gel and moist hand wipes that is designed to fit within a standard cup holder in a vehicle.

BACKGROUND

Many people are becoming increasingly interested in preventing the spread of germs and bacteria by keeping their hands clean. It is known that The Centers for Disease Control and Prevention (CDC) have recommended rigorous and regular use of soap and water to maintain appropriate hand hygiene. Further they have recommended the use of alcohol-based hand cleansers: gels, wipes and sprays when soap and water are not available and hands are not visibly dirty. It is further known that International Health organizations state that hands are one of the most frequent transmission routes for many infections as they come in direct contact with known portals of entry for pathogens (mouth, nose, conjunctiva of the eyes). Hands are typically the most active parts of the body, and regularly come into contact with other people, or with door handles, desktops, computer keyboards, food items, menus, etc., all of which may be laden with various germs and bacteria that were carried by the hands of other people touching those items. Hands may easily come in contact with germs or bacteria such as the common cold, flu, norovirus, e. coli, and many other dangerous diseases. The more we encourage hand cleanliness to reduce the presence of these germs and bacteria, the healthier we will be.

School age children are at particularly high risk for contacting and spreading germs and bacteria, as they tend to participate in more activities involving other children, and often neglect to maintain proper hand hygiene. The CDC recommends that children in school use alcohol-based hand rubs as an alternative to hand washing. Parents are often looking for convenient ways to encourage hand cleanliness among their children.

Some people use alcohol based gels that are designed to be rubbed on the hands and air dry. These gels are typically not recommended as the sole cleansing agent for hands that are visibly dirty. In these circumstances the hand gel used in conjunction with a sanitizing hand wipe provides a much improved alternative when soap and water are not available. Thus, many people like to have the benefit of available hand wipes, dry or moist, to assist in the removal of dirt as well as any remaining gel residue. Importantly, the term "hand wipe" as used herein and throughout the specification, is intended to encompass all manner of commonly known tissues or towelettes, moist or dry, which are intended to be used in wiping ones hands.

Hand gels and hand wipes are currently offered in a variety of typically disposable dispensers designed for various applications. Hand wipes are offered in many different packages, from individual single use foil packaging to large volume dispensers. If the hand wipes are moist, then the packaging system must also include the means to aid in maintaining the moisture level of the hand wipes. Comparatively larger hand gel dispensers typically have some type of pump to facilitate small amounts of gel being delivered directly into the palm of the hand, however hand sanitizing gels are also available in small squeeze bottle delivery systems.

One popular application for use of hand cleansers and moist hand wipes is placing them within a vehicle. In the car, the hand wipes may be used not only to assist in keeping one's hands clean, but also to keep frequently hand contacted parts of the vehicle clean, i.e. steering wheel, door handles etc., that have higher risk of germ contact. For the convenience of storing hand wipes in the vehicle, U.S. Pat. No. 6,279,775 issued to Parkes, et al. and U.S. Published Patent Application 2006/0076357 filed by Braat, et al. disclose hand wipe dispensers designed to fit within a vehicle cup holder.

However, the use and dispensing of hand wipes alone, without sanitizing gel, is not optimal in fighting the spread of germs and bacteria. While placing a hand wipe dispenser in the vehicle cup holder unquestionably provides convenience, the inability to conveniently store multiple cleansing agents means less options and that gel will not be used as often when attempting to clean hands in the vehicle.

Thus, there is clearly a need for a dispenser for both hand wipes and hand sanitizing gel that fits conveniently within a vehicle cup holder, and is portable so that it may be used outside of the vehicle as well. Such a combined dispenser would allow for having both items available and easily stored in the car. Such a dispenser may be disposable, but is preferably refillable, so that hand wipes and gel may be refilled as needed, because they will not likely be depleted simultaneously.

BRIEF SUMMARY

Briefly described, in an exemplary embodiment, a multifunctional hand sanitizer device comprises a combined hand wipe and gel dispenser for a vehicle cup holder. The container is partitioned internally to provide a first portion for storing hand wipes, and a second portion for holding sanitizing gel. It is anticipated that variations of a multifunctional hand sanitizer device may be partitioned into a plurality of portions such that other products such as, but not limited to, lotions may also be contained and dispensed. In some embodiments, a lid for covering the container is included, and the lid is configured to allow access to the hand wipes without having to remove the lid. The device may also have a pump in fluid communication with the gel to provide access to the gel. The pump aspect of some embodiments may be in communication with the sanitizing gel via a suction line that is located externally from the partitioned portions of the device while other embodiments may include a suction line that is run internally to the portions. Still other embodiments may comprise a pump suction line that is contained within the walls of the device. Also, some embodiments may not even comprise a pump as the gel contained within may be accessed via squeezing or some other suitable means.

In another illustrative embodiment of a multifunctional hand sanitizer device, the device is partitioned horizontally to provide an upper portion and a lower portion. The upper portion is designed to store the hand wipes, and sanitizing gel is stored in the lower portion.

In still another embodiment, the lid of the device features an opening to allow access to the hand wipes without removing the lid. In yet another embodiment, the opening feature in the lid includes a secondary lid for sealing the opening shut to reduce the amount of moisture that might escape from moist hand wipes contained within.

Further, in some embodiments of a multifunctional hand sanitizer device, the pump is located along the side of the device. The pump includes a fluid line that runs down the side of the device and enters the lower chamber to establish fluid communication with the sanitizing gel.

Notably, some embodiments of a multifunctional hand sanitizer device may include a unique gel packaging system. While the gel packaging system comprised within some embodiments of a multifunctional hand sanitizer device may be novel in and of itself, the inclusion, or exclusion, of a gel packaging system is not a limiting factor on the scope of the present disclosure.

Figure 1:
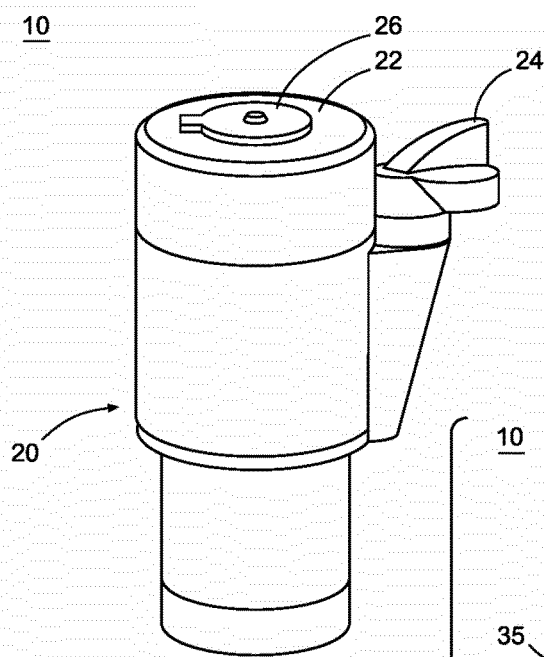
FIG. 1 is a perspective view of one embodiment of a multifunctional hand sanitizer device.

It is to be noted the drawings presented are intended solely for the purpose of illustration and they are, therefore, neither desired nor intended to limit the scope of the disclosure to any or all of the exact details of construction shown, except insofar as they may be deemed essential to the claimed invention.

DETAILED DESCRIPTION

In describing exemplary embodiments of a multifunctional hand sanitizer device that are illustrated in the drawings, specific terminology is employed for the sake of clarity. The claimed invention, however, is not intended to be limited to the specific terminology so selected, and it is to be understood that each specific element includes all technical equivalents that operate in a similar manner to accomplish a similar purpose.

Turning now to the figures, where like labels represent like elements throughout the drawings, various aspects, features and embodiments of a multifunctional hand sanitizer device will be presented in more detail. The examples as set forth in the drawings and detailed description are provided by way of explanation and are not meant as limitations on the scope of a multifunctional hand sanitizer device. A multifunctional hand sanitizer device thus includes any modifications and variations of the following examples as come within the scope of the appended claims and their equivalents.

FIG. 1 depicts a perspective view of one embodiment of a multifunctional hand sanitizer device 10. As shown, the device comprises a generally cylindrical container 20 that is designed to fit within a standard cup holder. Container 20 may be tapered, as shown, or more consistently cylindrical. Device 10 further includes a lid 22 and a pump 24. If moist hand wipes are used in the device, then lid 22 is preferably somewhat air tight to help keep moisture within container 20. In order to access the hand wipes, lid 22 may include secondary lid 26 that covers a secondary opening.

Pump 24 is designed to be in fluid communication with sanitizing gel within container 20. In an exemplary embodiment, pump 24 is positioned along the side of container 20 as shown in the figures, so as not to interfere with access to the hand wipes. The pump position shown is offered for illustrative purposes only, as other embodiments of a multifunctional hand sanitizer device may feature a pump mechanism that is positioned in a different location on the device.

Figure 2:
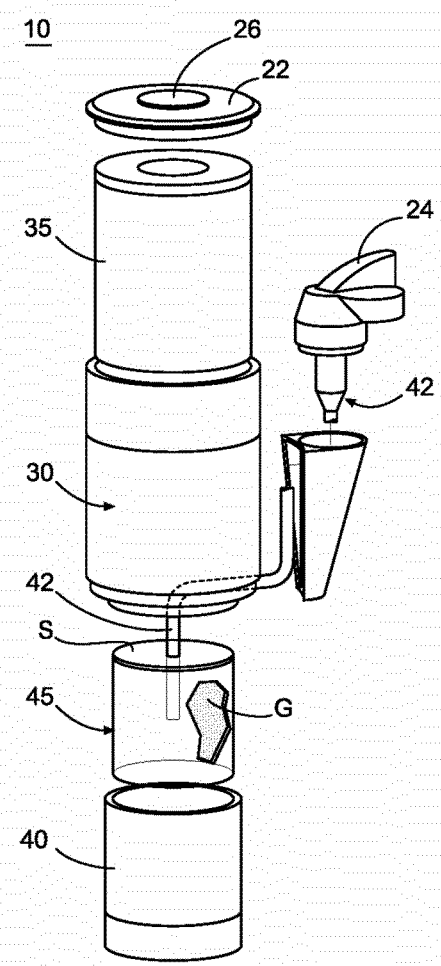
FIG. 2 is an exploded side view of an exemplary multifunctional hand sanitizer device.

Turning now to FIG. 2, a more detailed exploded view of an exemplary embodiment of a multifunctional hand sanitizer device is shown. In the illustrated embodiment, container 20 is segmented to provide an upper portion 30 and a lower portion 40. Upper portion 30 is designed to contain a roll of hand wipes 35, while lower portion 40 is designed to contain sanitizing gel G in container 45. Pump 24 is in fluid communication with gel G via fluid line 42.

Notably, the exemplary embodiment shown in the figures is designed to accommodate hand wipes provided in a roll form. Importantly, a multifunctional hand sanitizer device is not limited to the provision of hand wipes in roll form as it is anticipated that some embodiments, for example, may provide a means for containing and dispensing hand wipes that come in a stacked arrangement. Also, some embodiments, whether making use of hand wipes in rolled, stacked or some other form, may employ hand wipes that are connected one to another via perforations or, alternatively, a plurality of individual hand wipes that are not communicable to one another beyond physical proximity. Additionally, some embodiments of a multifunctional hand sanitizer device may even comprise features useful for tearing, separating, perforating or otherwise converting hand wipes or the equivalents thereof. Regardless, one skilled in the art will recognize that the inclusion, or exclusion, of any feature or delivery mechanism useful for accommodating various forms of hand wipes will not limit the scope of a multifunctional hand sanitizer device.

Now turning back to the exemplary embodiment of a multifunctional hand sanitizer device depicted in FIG. 2, hand wipe roll 35 may be any commonly commercially available roll of hand wipes, preferably moist hand wipes. Such hand wipes are available in perforated sheets rolled up cylindrically, as shown. Typically, the innermost hand wipe may be pulled out of the cylinder and ripped at the perforation, and the next hand wipe will then be sticking out of the roll and ready for the next use. Using such commonly available hand wipe rolls allows for easy refilling of the device when the towelettes are used up. Moreover and again, various embodiments of a multifunctional hand sanitizer device may be designed to accommodate other forms of hand wipes, whether such forms are available on a commercial basis or not.

It is anticipated that embodiments of a multifunctional hand sanitizer device may accommodate hand wipe cartridges that can be easily removed from the device and replaced when all wipes within have been used or, alternatively, hand wipe cartridges that can be refilled. An exemplary hand wipe cartridge may be in a cylindrical form with a removable tab that provides access to rolled wipes contained within. Further, other embodiments of a replaceable or disposable hand wipe cartridge may take any shape and accommodate hand wipes in various forms. Even further, hand wipe cartridges may be comprised of recyclable or biodegradable materials. Also, the access port to wipes contained within a hand wipe cartridge may be re-sealable by any means known in the art. A hand wipe cartridge may be a novel feature in and of itself and, further, may be comprised within some embodiments of a multifunctional hand sanitizer device. Even so, the inclusion, or exclusion, of a hand wipe cartridge in any given embodiment of a multifunctional hand sanitizer device is not a scope limiting factor.

Gel container 45, on the other hand, is a configuration that is not currently commercially available but is disclosed herein as an example of a novel feature that may be comprised within some embodiments of a multifunctional hand sanitizer device. The particular example of a replaceable, or refillable, gel container presently illustrated is offered for exemplary purposes only and is not meant to limit the form or design of a gel container feature. In the illustrated embodiment, gel container 45 is a small, cylindrical container that fits neatly within lower portion 40. Gel container 45 may have seal S that is designed to be easily punctured with a top portion made from thin foil, air tight polymers, or the like. Fluid line 42 may be designed to puncture this top portion of gel container 45, thereby providing a connection with pump 24. In this particular embodiment, it is contemplated that a seller of device 10 might also arrange for sales of disposable gel containers 45 that are easily refilled within the device 10. Alternatively, it is anticipated that disposable gel containers may be just that, i.e. disposable, and not intended to be refilled. Gel container 45 might also be designed as a permanent container with a removable cap, so that a user may refill the gel by opening the cap, filling the container with gel, and then resealing the cap. As previously stated, device 10 might also be designed to be disposable, so that no refill replacements are needed. Importantly, while the "gel" aspects of the various embodiments are described using the word gel, it should be understood that some aspects and features are not limited in any way to the storage or delivery of a "gel" liquid as it is anticipated that some embodiments may employ other liquids having non-gel like viscosities.

With respect to the construction of device 10, as stated above it is contemplated that embodiments of device 10 may be a substantially permanent device that may be refilled with hand wipes and sanitizing gel as needed. As such, device 10 would preferably be constructed from extremely sturdy polymeric materials or metals, or mixtures thereof. Even so, preferred materials of construction for a multifunctional hand sanitizer device will be known by those skilled in the art and, while material choice may be shown to provide novel aspects, the choice of materials should not limit the scope of a multifunctional hand sanitizer device. For exemplary purposes, device 10 may be constructed with an aluminum exterior and polymeric, moisture trapping, interior. If device 10 is designed to be disposable, then it may be constructed out of less sturdy polymers or recyclable materials.

Figure 3:
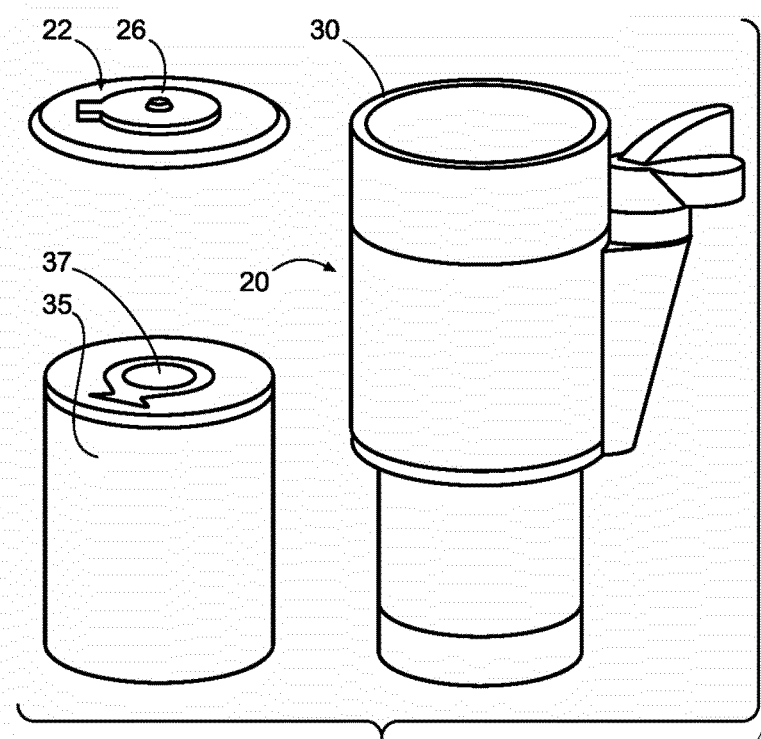
FIG. 3 is a perspective view of one embodiment of a multifunctional hand sanitizer device illustrating the loading of exemplary hand wipes into the device.

Turning now to FIG. 3, a more detailed view of the upper portion 30 of the exemplary embodiment and the associated hand wipes 35 is shown. Lid 22 preferably attaches to container 20 in a substantially air tight manner, such as a threaded cap assembly. In this way, lid 22 may be easily removed to install a new roll of hand wipes 35, and then re-attached to container 20. In order to access hand wipes 35, a user does not have to remove lid 22, but instead may open secondary lid 26 to reveal a secondary opening 37. A small piece of the hand wipe at the center of the roll may be placed within secondary opening 37 for access. When the hand wipe is pulled through opening 37, the shape of the opening may assist in both tearing the perforation, and trapping a small piece of the next hand wipe so that it may be accessed when needed. Secondary lid 26 is preferably closed after use to keep moisture within upper portion 30 of container 20.

Figure 4:
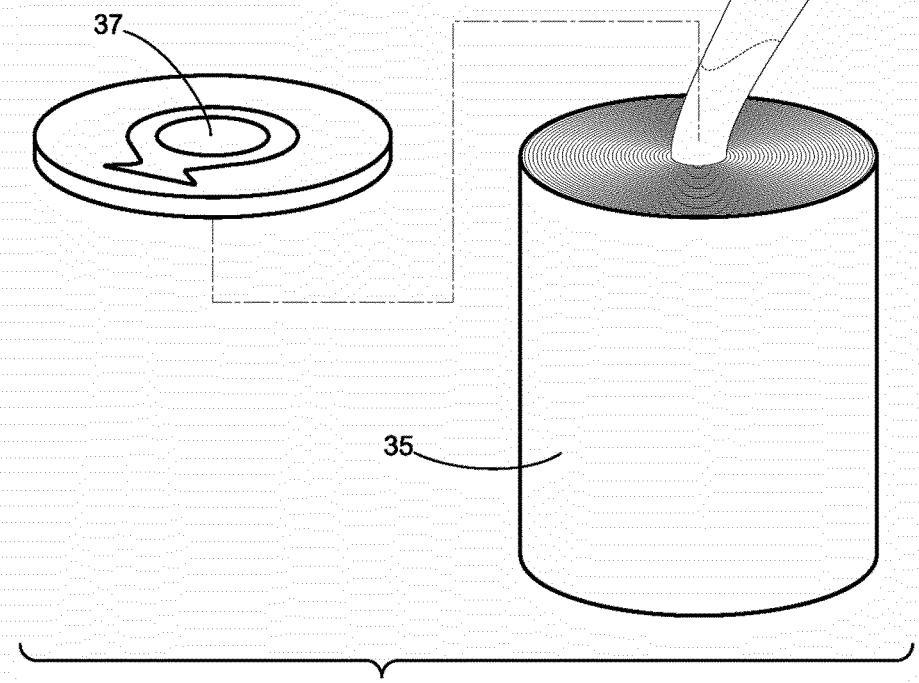
FIG. 4 depicts a roll of hand wipes that may be used with some embodiments of a multifunctional hand sanitizer device.

FIG. 4 illustrates the type of hand wipe roll 35 that may be used with the exemplary embodiment of a multifunctional hand sanitizer device depicted in the drawings. Again, it should be understood that a multifunctional hand sanitizer device is not limited to the use of hand wipe rolls such as shown here.

Figure 5:
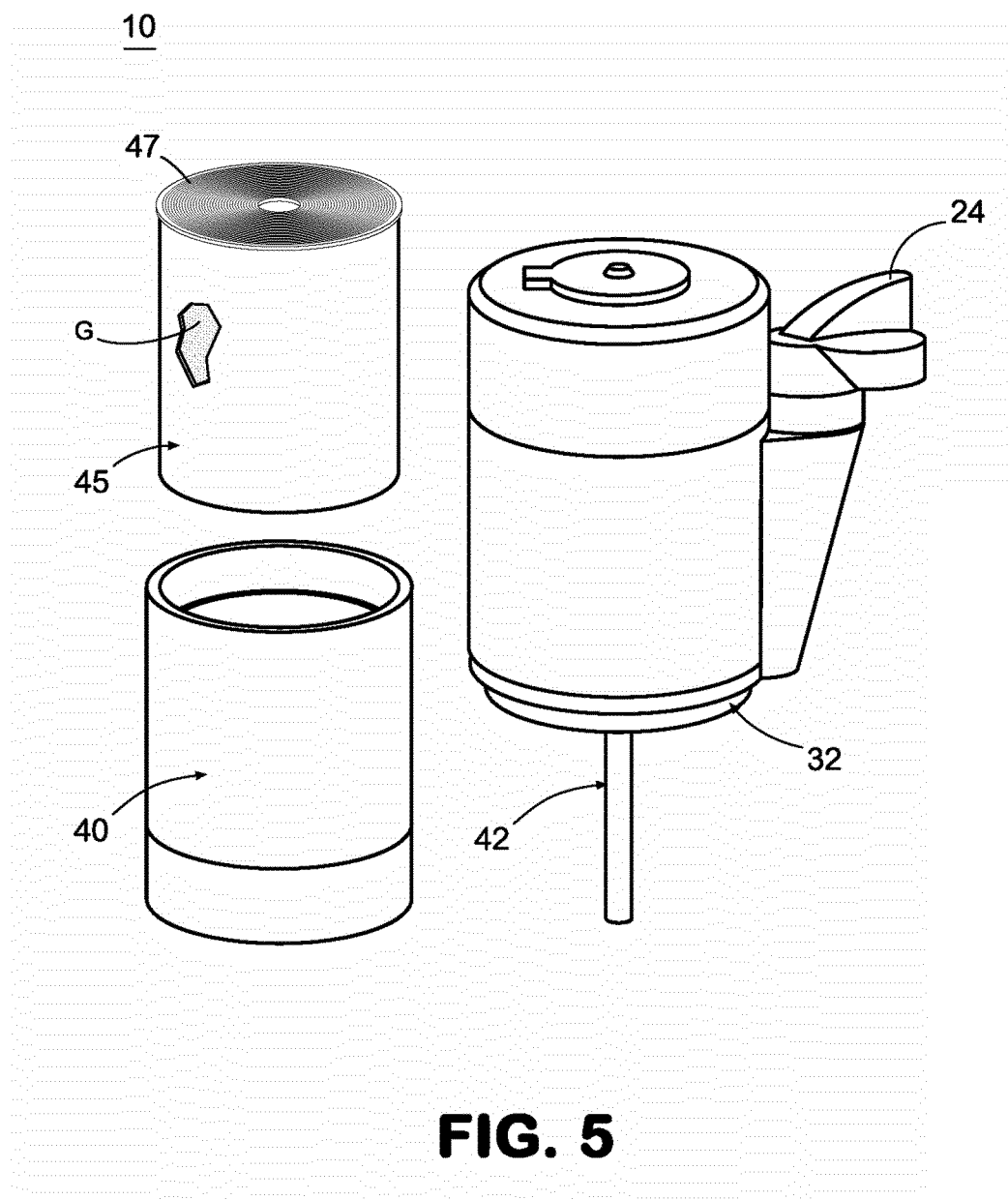
FIG. 5 is a perspective view of one embodiment of a multifunctional hand sanitizer device illustrating how an exemplary gel packaging system may be loaded into the device.

FIG. 5 illustrates how exemplary gel container 45 may be used with some embodiments of a multifunctional hand sanitizer device. As set forth above, a disposable gel container is not presently commercially available, but may be a convenient method of providing gel for some embodiments of a multifunctional hand sanitizer device. Again, it should be noted that a multifunctional hand sanitizer device is not limited to comprise a gel container aspect such as the one presently shown.

In one exemplary embodiment, lower portion 40 of container 20 may actually be removed, such as by a threaded attachment or some other means. Removing lower portion 40 reveals fluid line 42 which may pass through partition 32. The empty gel container 45 may be removed from lower portion 40 and replaced with a new gel container 45. Lower portion 40 may then be reattached to container 20, thereby causing fluid line 42 to puncture the top layer 47 of the new gel container 45, thus establishing fluid communication between pump 24 and the gel within new container 45.

Figure 6:
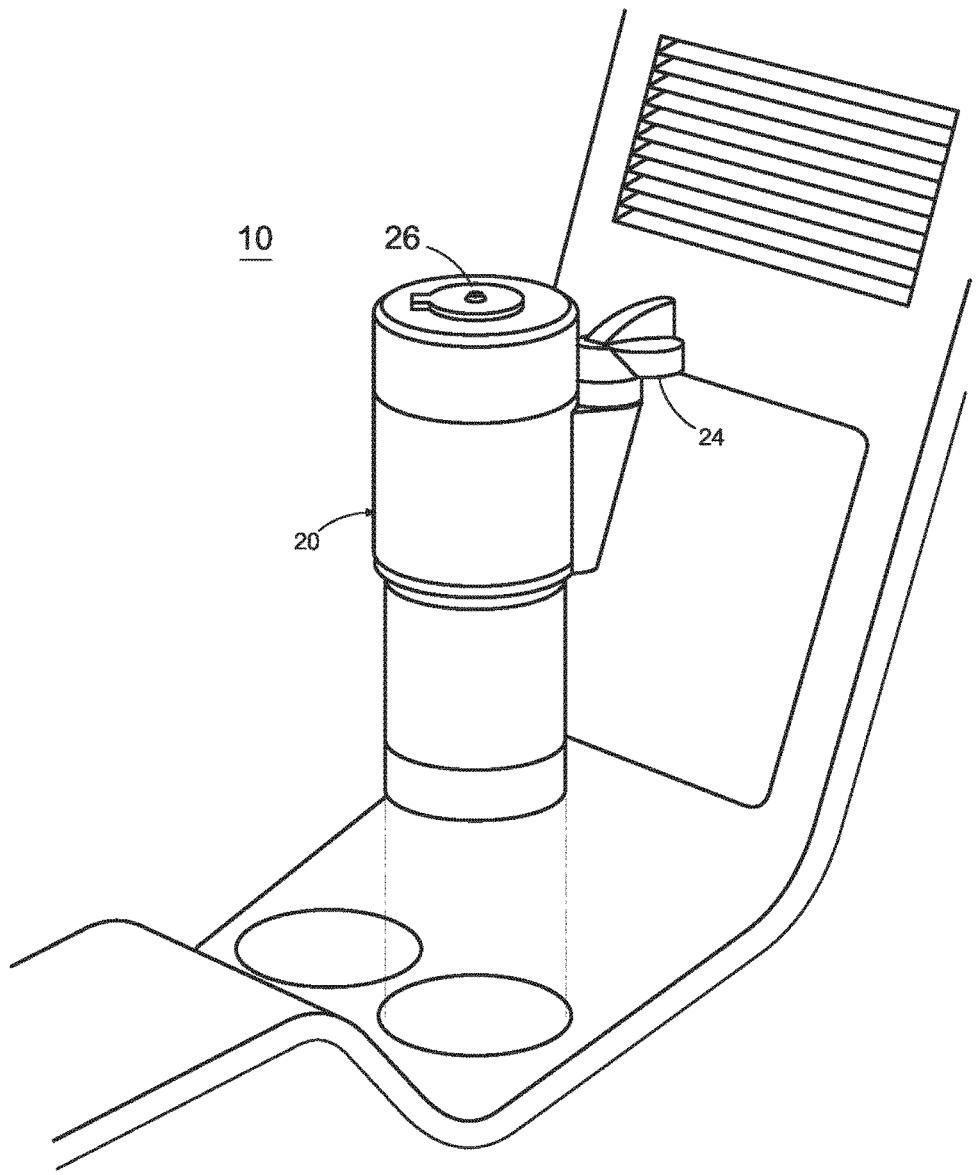
FIG. 6 illustrates how some embodiments of a multifunctional hand sanitizer device might be communicable with a vehicle cup holder.

FIG. 6 illustrates how an exemplary multifunctional hand sanitizer device 10 may fit within a standard cup holder, such as a cup holder commonly found in a vehicle. If a multifunctional hand sanitizer device, such as the exemplary embodiment illustrated in FIG. 6, is designed with a flat bottom and sufficient balance, then it may also be conveniently portable. In this way, the device may be taken inside, for example, to a restaurant, so that family members may all clean and sanitize their hands before eating.

A multifunctional hand sanitizer device has been described using detailed descriptions of embodiments thereof that are provided by way of example and are not intended to limit the scope of the device. The described embodiments comprise different features, not all of which are required in all embodiments of a multifunctional hand sanitizer device. Some embodiments of a multifunctional hand sanitizer device utilize only some of the features or possible combinations of the features. Variations of embodiments of a multifunctional hand sanitizer device that are described and embodiments of a multifunctional hand sanitizer device comprising different combinations of features noted in the described embodiments will occur to persons of the art.

It will be appreciated by persons skilled in the art that a multifunctional hand sanitizer device is not limited by what has been particularly shown and described herein above. Rather, the scope of a multifunctional hand sanitizer device is defined by the claims that follow.

What is claimed is:

1. An internally partitioned dispensing device configured for placement in a space defined by a vehicle cup holder comprising:
   a container having a first upper portion and a second lower portion, wherein the first upper portion defines a space that is configured to hold hand wipes and the second lower portion defines a space that is configured to hold a liquid;
   a lid for covering the first upper portion of the container, wherein the lid comprises an access port to allow access to the space defined by the first upper portion; and
   a pump in fluid communication via a fluid line with the space defined by the second lower portion, wherein an actuation portion of the pump is positioned external to the container and the fluid line extends from the space defined by the second lower portion to the externally positioned actuation portion of the pump; and
   wherein an exterior surface of the container is tapered to fit within the cup holder such that the container is not prone to shifting; and
   wherein, when the dispensing device is placed in the vehicle cup holder, both the access port of the lid and the actuation portion of the pump are positioned above the space defined by the cup holder.

2. The dispensing device of claim 1, further comprising a liquid contained within the space defined by the second lower portion.

3. The dispensing device of claim 1, further comprising hand wipes within the space defined by the first upper portion.

4. The dispensing device of claim 1, wherein the lid further comprises a secondary lid for closing the access port.

5. The dispensing device of claim 1, wherein the actuation portion of the pump is mechanically coupled to a side of the container.

6. The dispensing device of claim 1, wherein at least a portion of the fluid line is external to the container.

7. The dispensing device of claim 1, wherein the fluid line is integral to a wall of the container.

8. An internally partitioned dispensing device configured for placement in a space defined by a vehicle cup holder comprising:
   at least a first upper portion and a second lower portion, wherein the first upper portion defines a space that is configured to hold hand wipes and the second lower portion defines a space that is configured to contain a liquid holding device;
   a liquid holding device contained within the second lower portion, wherein the liquid holding device may be removed from the second lower portion; and
   a pumping means in fluid communication via a fluid line with the liquid holding device that is contained in the second lower portion, wherein an actuation portion of the pumping means is positioned external to the dispensing device and the fluid line extends from the liquid holding device to the externally positioned actuation portion of the pumping means; and
   wherein, when the dispensing device is placed in the vehicle cup holder, both the space defined by the first upper portion and the actuation portion of the pumping means are positioned above the space defined by the cup holder.

9. The dispensing device of claim 8, further comprising a hand wipe cartridge within the space defined by the first upper portion, wherein the hand wipe cartridge may be removed from the first upper portion.

10. The dispensing device of claim 9, wherein the liquid holding device and hand wipe cartridge are refillable.

11. The dispensing device of claim 8, wherein at least a portion of the pumping means is in mechanical communication with an external side surface of the dispensing device.

12. The dispensing device of claim 11, wherein the liquid holding device further comprises a seal that is penetrable by the suction line.

13. The dispensing device of claim 8, further comprising a lid for restricting access to the space defined by the first upper portion of the container.

14. The dispensing device of claim 13, wherein the lid further comprises an access port for allowing access to hand wipes contained within the space defined by the first upper portion.

15. The dispensing device of claim 14, wherein the lid further comprises a secondary lid for closing the access port.

16. The dispensing device of claim 8, wherein the device is modular such that at least one of the first upper portion and second lower portion may be decoupled from the device.

* * * * *